(12) United States Patent
Strange (10) Patent No.: US 10,079,043 B2
(45) Date of Patent: Sep. 18, 2018

(54) METHOD OF SEALING A RE-WORKABLE HARD DISK DRIVE

(71) Applicant: entrotech, inc., Columbus, OH (US)

(72) Inventor: Andrew C. Strange, Worthington, OH (US)

(73) Assignee: entrotech, inc., Columbus, OH (US)

( * ) Notice: Subject to any disclaimer, the term of this patent is extended or adjusted under 35 U.S.C. 154(b) by 276 days.

(21) Appl. No.: 14/439,152

(22) PCT Filed: Apr. 22, 2015

(86) PCT No.: PCT/US2015/027181
§ 371 (c)(1),
(2) Date: Apr. 28, 2015

(87) PCT Pub. No.: WO2015/164551
PCT Pub. Date: Oct. 29, 2015

(65) Prior Publication Data
US 2016/0104515 A1    Apr. 14, 2016

Related U.S. Application Data

(60) Provisional application No. 61/982,852, filed on Apr. 22, 2014.

(51) Int. Cl.
*G11B 5/127* (2006.01)
*H04R 31/00* (2006.01)
(Continued)

(52) U.S. Cl.
CPC ........ *G11B 33/1466* (2013.01); *G11B 25/043* (2013.01); *G11B 33/027* (2013.01)

(58) Field of Classification Search
CPC . G11B 25/043; G11B 33/027; G11B 33/1466; G11B 33/14; G11B 5/105
(Continued)

(56) References Cited

U.S. PATENT DOCUMENTS 3,596,828 A    8/1971  Foster et al.
4,058,632 A   11/1977  Evans et al.
(Continued)

FOREIGN PATENT DOCUMENTS

EP    0 546 680       6/1993
EP    1262304 B1      4/2012
(Continued)

OTHER PUBLICATIONS

"Donaldson Filtration Systems Adsorbent Label Filter (ALF): Disk Drive," Donaldson Company, Inc., Minneapolis, MN (Jul. 31, 2010).
(Continued)

*Primary Examiner* — Paul D Kim
(74) *Attorney, Agent, or Firm* — The Griffith Law Firm, A P.C.; Lisa M. Griffith (57) ABSTRACT

Cover seals for sealing of a re-workable hard disk drive comprise: a metallic substrate; an outwardly exposed adhesive layer on at least a portion of a major surface of the metallic substrate; and an adhesive-free border comprising a fusible metal alloy layer surrounding the adhesive layer. The cover seals can be used to form sealed hard disk drives, wherein a cover seal is attached to an exterior surface of the cover of an enclosed hard disk drive housing so that an adhesive layer of the cover seal covers the entire junction where the base and cover components of the enclosed housing meet and a metallic joint adheres a perimeter of the cover seal to the base of the enclosed housing.

24 Claims, 3 Drawing Sheets

(51) Int. Cl.
  *G11B 33/14* (2006.01)
  *G11B 25/04* (2006.01)
  *G11B 33/02* (2006.01)

(58) Field of Classification Search
  USPC ............ 29/603.03, 603.04, 603.06; 360/121, 360/122, 317
  See application file for complete search history.

(56) References Cited

U.S. PATENT DOCUMENTS

| | | | |
|---|---|---|---|
| 4,096,309 A | 6/1978 | Stillman | |
| 4,284,672 A | 8/1981 | Stillman | |
| 4,306,259 A | 12/1981 | Saito et al. | |
| 4,367,503 A | 1/1983 | Treseder | |
| 4,642,715 A | 2/1987 | Ende | |
| 4,662,521 A | 5/1987 | Moretti | |
| 4,686,592 A | 8/1987 | Carroll et al. | |
| 4,795,907 A | 1/1989 | Maekawa et al. | |
| 4,855,849 A | 8/1989 | Jones et al. | |
| 4,965,691 A | 10/1990 | Iftikar et al. | |
| 5,025,335 A | 6/1991 | Stefansky | |
| 5,147,086 A | 9/1992 | Fujikawa et al. | |
| 5,150,267 A | 9/1992 | Reinisch et al. | |
| 5,157,831 A | 10/1992 | Wang et al. | |
| 5,175,657 A | 12/1992 | Iftikar et al. | |
| 5,214,550 A | 5/1993 | Chan | |
| 5,233,491 A | 8/1993 | Kadonaga et al. | |
| 5,235,481 A | 8/1993 | Kamo et al. | |
| 5,243,495 A | 9/1993 | Read et al. | |
| 5,247,410 A | 9/1993 | Ebihara et al. | |
| 5,253,129 A | 10/1993 | Blackborow et al. | |
| 5,270,887 A | 12/1993 | Edwards et al. | |
| 5,282,099 A | 1/1994 | Kawagoe et al. | |
| 5,317,463 A | 5/1994 | Lemke et al. | |
| 5,376,424 A | 12/1994 | Watanabe | |
| 5,454,157 A | 10/1995 | Ananth et al. | |
| 5,536,917 A | 7/1996 | Suppelsa et al. | |
| 5,559,650 A | 9/1996 | Repphun et al. | |
| 5,587,854 A | 12/1996 | Sato et al. | |
| 5,587,855 A | 12/1996 | Kim | |
| 5,608,592 A | 3/1997 | Mizoshita et al. | |
| 5,703,735 A | 12/1997 | Bleeke | |
| 5,722,538 A | 3/1998 | Neely et al. | |
| 5,732,063 A | 3/1998 | Chen | |
| 5,751,514 A | 5/1998 | Hyde et al. | |
| 5,781,373 A | 7/1998 | Larson et al. | |
| 5,837,934 A | 11/1998 | Valavanis et al. | |
| 5,880,904 A | 3/1999 | Mizoshita et al. | |
| 5,898,537 A | 4/1999 | Oizumi et al. | |
| 5,969,901 A | 10/1999 | Eckberg et al. | |
| 6,008,965 A | 12/1999 | Izumi et al. | |
| 6,023,392 A * | 2/2000 | Kim | G11B 25/043 29/603.03 |
| 6,108,164 A | 8/2000 | Weber | |
| 6,129,579 A | 10/2000 | Cox et al. | |
| 6,168,459 B1 | 1/2001 | Cox et al. | |
| 6,181,530 B1 | 1/2001 | Ratliff et al. | |
| 6,226,143 B1 * | 5/2001 | Stefanksy | G11B 5/5526 360/99.2 |
| 6,236,532 B1 | 5/2001 | Yanagisawa | |
| 6,243,262 B1 | 6/2001 | Koo et al. | |
| 6,258,432 B1 | 7/2001 | Terada et al. | |
| 6,317,286 B1 | 11/2001 | Murphy et al. | |
| 6,339,521 B1 | 1/2002 | Durrum et al. | |
| 6,357,001 B1 | 3/2002 | Brower et al. | |
| 6,392,838 B1 | 5/2002 | Hearn et al. | |
| 6,397,932 B1 | 6/2002 | Calaman et al. | |
| 6,407,659 B2 | 6/2002 | Mochida et al. | |
| 6,430,000 B1 | 8/2002 | Rent | |
| 6,438,685 B1 | 8/2002 | Brower et al. | |
| 6,442,021 B1 | 8/2002 | Bologna et al. | |
| 6,469,864 B2 | 10/2002 | Kamezawa et al. | |
| 6,473,264 B2 | 10/2002 | Bae et al. | |
| 6,480,353 B1 | 11/2002 | Sacks et al. | |
| 6,525,899 B2 | 2/2003 | Hearn et al. | |
| 6,560,064 B1 | 5/2003 | Hirano | |
| 6,570,736 B2 | 5/2003 | Noda | |
| 6,639,757 B2 | 10/2003 | Morley et al. | |
| 6,646,821 B2 | 11/2003 | Bernett et al. | |
| 6,650,961 B2 | 11/2003 | Deckers | |
| 6,673,460 B2 | 1/2004 | Imai et al. | |
| 6,678,112 B1 | 1/2004 | Kaneko | |
| 6,693,767 B1 | 2/2004 | Butler | |
| 6,762,909 B2 | 7/2004 | Albrecht et al. | |
| 6,765,751 B2 | 7/2004 | Huang et al. | |
| 6,785,082 B2 | 8/2004 | Fiorvanti et al. | |
| 6,831,811 B1 | 12/2004 | Andrikowich et al. | |
| 6,876,514 B1 | 4/2005 | Little | |
| 6,934,118 B2 | 8/2005 | Hidaka et al. | |
| 6,934,958 B2 | 8/2005 | Lin et al. | |
| 6,940,687 B2 | 9/2005 | Hong et al. | |
| 7,054,153 B2 | 5/2006 | Lewis et al. | |
| 7,082,012 B2 | 7/2006 | Macpherson et al. | |
| 7,119,984 B2 | 10/2006 | Macleod et al. | |
| 7,130,149 B2 | 10/2006 | Hong et al. | |
| 7,206,164 B2 | 4/2007 | Hofland et al. | |
| 7,218,473 B2 | 5/2007 | Bernett et al. | |
| 7,239,593 B2 | 7/2007 | Abe | |
| 7,274,534 B1 | 9/2007 | Choy et al. | |
| 7,285,318 B2 | 10/2007 | Kaku et al. | |
| 7,295,399 B2 | 11/2007 | Konno et al. | |
| 7,300,500 B2 | 11/2007 | Okada et al. | |
| 7,301,776 B1 | 11/2007 | Wang et al. | |
| 7,315,447 B2 * | 1/2008 | Inoue | G06F 1/184 174/544 |
| 7,330,334 B2 | 2/2008 | Shimizu et al. | |
| 7,362,541 B2 * | 4/2008 | Bernett | G11B 33/1466 360/99.21 |
| 7,414,813 B2 | 8/2008 | Huynh | |
| 7,420,771 B1 | 9/2008 | Hanke et al. | |
| 7,484,291 B1 | 2/2009 | Ostrander et al. | |
| 7,508,622 B2 | 3/2009 | Martin et al. | |
| 7,525,758 B2 | 4/2009 | Abe | |
| 7,570,460 B2 * | 8/2009 | Kitahori | G11B 5/4813 360/265.6 |
| 7,616,400 B2 | 11/2009 | Byun et al. | |
| 7,630,169 B2 | 12/2009 | Murakami | |
| 7,684,146 B1 | 3/2010 | Andrikowich et al. | |
| 7,813,129 B2 | 10/2010 | Van Der Werff | |
| 7,821,735 B1 * | 10/2010 | Bogacz | G11B 25/043 360/99.21 |
| 8,014,167 B2 * | 9/2011 | Gunderson | F16J 15/102 174/250 |
| 8,018,687 B1 | 9/2011 | Little et al. | |
| 8,098,454 B2 | 1/2012 | Kouno et al. | |
| 8,194,348 B2 | 6/2012 | Jacoby et al. | |
| 8,248,724 B2 * | 8/2012 | Hayakawa | G11B 25/043 360/97.12 |
| 8,248,777 B2 | 8/2012 | Prest | |
| 8,274,755 B2 | 9/2012 | Ishima et al. | |
| 8,427,787 B2 | 4/2013 | McGuire, Jr. | |
| 8,451,559 B1 | 5/2013 | Berding et al. | |
| 8,533,934 B2 | 9/2013 | McGuire, Jr. et al. | |
| 8,593,760 B2 | 11/2013 | McGuire, Jr. | |
| 8,599,514 B2 | 12/2013 | McGuire, Jr. | |
| 8,659,859 B1 | 2/2014 | Hayakawa et al. | |
| 8,859,913 B2 | 10/2014 | Judy | |
| 9,190,115 B2 | 11/2015 | McGuire, Jr. et al. | |
| 2001/0042301 A1 | 11/2001 | Khuu | |
| 2002/0149885 A1 | 10/2002 | Dague et al. | |
| 2002/0196580 A1 | 12/2002 | Tsukahara et al. | |
| 2003/0081347 A1 | 5/2003 | Neal et al. | |
| 2003/0081349 A1 | 5/2003 | Bernett | |
| 2003/0089417 A1 | 5/2003 | Bernett | |
| 2003/0179488 A1 | 9/2003 | Kant et al. | |
| 2003/0179489 A1 | 9/2003 | Bernett et al. | |
| 2003/0223148 A1 | 12/2003 | Macleod et al. | |
| 2004/0070867 A1 | 4/2004 | Kudo et al. | |
| 2004/0134825 A1 | 7/2004 | Navickas | |
| 2004/0150909 A1 | 8/2004 | Kimura | |
| 2004/0169956 A1 | 9/2004 | Oba et al. | |
| 2004/0184184 A1 | 9/2004 | Komatsu et al. | |
| 2004/0207980 A1 | 10/2004 | Kobayashi | |

(56) References Cited

U.S. PATENT DOCUMENTS

| | | |
|---|---|---|
| 2005/0013039 A1 | 1/2005 | Matsumura et al. |
| 2005/0041334 A1 | 2/2005 | Kim et al. |
| 2005/0057849 A1 | 3/2005 | Twogood et al. |
| 2005/0094312 A1 | 5/2005 | Sato |
| 2005/0130457 A1 | 6/2005 | Nozaki et al. |
| 2005/0237708 A1 | 10/2005 | Chen |
| 2006/0050429 A1 | 3/2006 | Gunderson et al. |
| 2006/0139873 A1 | 6/2006 | Tomizawa et al. |
| 2006/0176610 A1 | 8/2006 | Tsuda et al. |
| 2007/0002489 A1 | 1/2007 | Abe |
| 2007/0034406 A1 | 2/2007 | Schroader |
| 2007/0171567 A1 | 7/2007 | Choi et al. |
| 2007/0171568 A1 | 7/2007 | Boss et al. |
| 2008/0084631 A1 | 4/2008 | Chan et al. |
| 2008/0088969 A1 | 4/2008 | Uefune et al. |
| 2008/0174910 A1 | 7/2008 | Hirono et al. |
| 2008/0212237 A1 | 9/2008 | Uefune et al. |
| 2008/0226534 A1 | 9/2008 | Gidumal et al. |
| 2009/0073328 A1 | 3/2009 | Gunderson et al. |
| 2009/0073842 A1 | 3/2009 | Kim |
| 2009/0116141 A1 | 5/2009 | Brown |
| 2009/0183475 A1 | 7/2009 | Dauber et al. |
| 2009/0256244 A1 | 10/2009 | Liao et al. |
| 2009/0290294 A1 | 11/2009 | Prest |
| 2011/0122567 A1 | 5/2011 | Cheah et al. |
| 2011/0135949 A1 | 6/2011 | Elia |
| 2011/0212281 A1 | 9/2011 | Jacoby et al. |
| 2012/0120562 A1 | 5/2012 | Prest et al. |
| 2012/0164446 A1 | 6/2012 | Nakahira et al. |
| 2012/0275052 A1 | 11/2012 | McGuire, Jr. |
| 2012/0275053 A1 | 11/2012 | McGuire, Jr. |
| 2012/0275054 A1 | 11/2012 | McGuire, Jr. |
| 2012/0275055 A1 | 11/2012 | McGuire, Jr. |
| 2012/0275056 A1 | 11/2012 | McGuire, Jr. |
| 2012/0275057 A1 | 11/2012 | McGuire, Jr. |
| 2012/0275105 A1 | 11/2012 | McGuire, Jr. |
| 2012/0275106 A1 | 11/2012 | McGuire, Jr. |
| 2012/0275285 A1 | 11/2012 | McGuire, Jr. |
| 2012/0275286 A1 | 11/2012 | McGuire, Jr. |
| 2012/0275287 A1 | 11/2012 | McGuire, Jr. |
| 2013/0277101 A1 | 10/2013 | Judy |
| 2014/0118927 A1 | 5/2014 | Hamburgen |
| 2015/0069056 A1 | 3/2015 | Kishimoto et al. |
| 2016/0307606 A1 | 10/2016 | McGuire, Jr. |

FOREIGN PATENT DOCUMENTS

| | | |
|---|---|---|
| GB | 0173783 | 1/1923 |
| GB | 1475080 | 6/1977 |
| JP | 06-008947 | 1/1994 |
| JP | 6-218799 | 8/1994 |
| JP | 08-045256 | 2/1996 |
| JP | 10-055662 | 2/1998 |
| JP | 2000-215642 | 8/2000 |
| JP | 2009-038269 A | 2/2009 |
| JP | 2011-240934 | 12/2011 |
| WO | WO-2005/117018 | 12/2005 |
| WO | WO-2015/191479 | 12/2015 |

OTHER PUBLICATIONS

"Donaldson Filtration Systems Adsorbent Pouch Filter (APF): Disk Drive," Donaldson Company, Inc., Minneapolis, MN (Jul. 31, 2010).

"First Hermetically Sealed, Helium HDD Platform Provides Path for Higher Capacity Storage, While Significantly Lowering Power and Cooling, and Improving Storage Density," http://www.hgst.com/press-room/press-releases/hgst-ships-6TB-Ultrastar-HE6-helium-filled (Nov. 4, 2013).

"Infrared," http://en.wikipedia.org/wiki/Infrared (Feb. 14, 2011).

"Laser Makes Invisible Welds in Plastics," *Connect*, No. 100; http://www.twi.co.uk/content/c1008b.html (May 31, 1999).

"Laser Welding of Plastics (Knowledge Summary)," http://www.twi.co.uk/content/ksab002.html (Dec. 31, 2009).

"Nd:YAG laser," http://en.wikipedia.org/wiki/Nd:YAG_laser (Feb. 14, 2011).

Jones, Ian, "Clearweld (Knowledge Summary)," http://www.twi.co.uk/content/ksiaj001.html (Dec. 31, 2010).

Venkat, Sri et al., "Sealing Plastic Seams With Laser Welding," www.devicelink.com/mddi (May 31, 2008).

Warwick, Marcus et al., "Application Studies Using Through-Transmission Laser Welding of Polymers," http://www.twi.co.uk/content/spcmwapr2006.html (Apr. 25, 2006).

* cited by examiner

Fig. 1
(PRIOR ART)

METHOD OF SEALING A RE-WORKABLE HARD DISK DRIVE

BACKGROUND OF THE INVENTION

The present invention relates generally to hard disk drives that are re-workable, yet capable of being effectively sealed, and cover seals useful therefor.

A disk drive is a device used to store information in a computing environment. In a disk drive, data is generally recorded on planar, round, rotating surfaces (which are commonly referred to as disks, discs, or platters). There are several types of disk drives, including optical disk drives, floppy disk drives, and hard disk drives. Nowadays, hard disk drives tend to be most common. Strictly speaking, "drive" refers to a device distinct from its medium, such as a tape drive and its tape, or a floppy disk drive and its floppy disk. A hard disk drive (sometimes referred to as a HDD), also referred to as a hard drive, hard disk, or fixed disk drive, is a non-volatile storage device that stores digitally encoded data on rapidly rotating platters with magnetic surfaces. Early hard disk drives had removable media; however, a HDD today is typically an encased unit with fixed media.

A typical hard disk drive includes a head disk assembly (HDA) and a printed circuit board assembly (PCBA) attached to a disk drive base of the HDA. The HDA typically includes at least one magnetic disk, a spindle motor for rotating the disk, and a head stack assembly (HSA) having an actuator assembly with at least one transducer head, typically several, for reading and writing data from the disk. The PCBA includes a servo control system in the form of a disk controller for generating servo control signals. The HSA is controllably positioned in response to the generated servo control signals from the disk controller. In so doing, the attached heads are moved relative to tracks disposed upon the disk. The heads are typically distanced from the magnetic disk by a gaseous cushion—so that they are said to "fly" over the disk. Thus, it is important that the position of the heads be well-controlled for proper reading and writing from the disk.

Hard disk drives are generally sealed to prevent dust and other external sources of contamination from interfering with operation of the hard disk heads therein. Some hard disk drives are hermetically sealed. A hermetic seal is generally understood to be an airtight seal. Note that some seals (e.g., those "sealing" air within the hard disk drive) are not literally air tight, but rather utilize an extremely fine air filter in conjunction with air circulation inside the hard drive enclosure. The spinning of the disks causes air to circulate therein, forcing any particulates to become trapped on the filter. The same air currents also act as a gas bearing, which enables the heads to float on a cushion of air above the surfaces of the disks. However, "hermetically" sealed means that the seal is so airtight that the disk drive's internal pressure is substantially independent of the external or ambient pressure. This is in contrast to a conventional or non-hermetically sealed disk drive that has a breather port with a filter in a wall of the base plate or cover for equalizing the disk drive's internal pressure with the external pressure. Thus, a hermetically sealed drive does not contain a breather port.

Within a hermetically sealed hard disk drive, gases other than atmospheric air are often employed. Filling the sealed environment of a hard disk drive with gases other than air can enhance their performance. For example, use of lower density inert gases, such as helium, can reduce aerodynamic drag between the disks and their associated read/write heads by a factor of approximately five-to-one as compared to their operation in air. This reduced drag beneficially results in reduced power requirements for the spindle motor. A helium-filled drive, thus, uses substantially less power than a comparable hard disk drive operating in an air environment. At the same time, the helium gas also conducts heat generated during operation of the disk drive away more effectively than air.

Hermetically sealed hard disk drives are first filled with a desired gaseous medium (whether it be atmospheric air or one or more other gases) before operation. Then, if the constituency of the gaseous medium substantially changes due to leakage of the hard disk drive housing, the hard disk drive must be either discarded or refilled with the desired gaseous medium. Filling disk drives to a desired pressure and concentration of gaseous components, however, can be both time-consuming and difficult. A number of patent documents focus on providing and/or replenishing gases such as helium at a desired concentration within a hard disk drive. See, for example, U.S. Patent Publication Nos. 2003/0081349 and 2003/0089417. Also see U.S. Pat. No. 6,560,064.

Due to imperfect sealing of hard disk drive housings, the benefits of using lower density gases such as helium are conventionally not longstanding. Potential paths of leakage (allowing both air flow into the hard disk drive housing and allowing gas outflow from the hard disk drive housing) include those paths existing at the junction of two mating components thereof. Those components include, for example, screws or other mechanical fasteners used to conventionally fasten multiple parts of the housing together. In addition, gasket seals and the like used to improve the seal between multiple components are often susceptible to at least some leakage. As gas such as helium leaks out of a sealed hard disk drive, air leaks in (or vice versa), causing undesirable effects in the operation of the disk drives—even possibly causing the disk drives to catastrophically fail. For example, an increased concentration of air inside the hard disk drive may increase forces on the read/write head therein due to turbulent airflow within the drive. Further, such undesired air may cause the read/write heads to "fly" at too great a distance above the disks. The risk of unexpected failure due to inadequate concentration of helium within such drives is a considerable drawback to helium-filled disk drives, particularly since the data stored within the disk drive can be irretrievably lost if the disk drive fails.

Conventional problems associated with helium-filled hard disk drives are being overcome, but solutions are slow to evolve. Recently, HGST, a Western Digital company, announced its 6 TB Ultrastar He6 hard disk drive based on HGST's trademarked HelioSeal technology. According to a 2013 press release, such technology provides the industry's first helium-filled platform that simultaneously increases disk drive capacity while lowering its power consumption and operating temperature.

Effective cooling of hard disk drives is becoming a notable challenge due to increased power consumption and associated generation of heat in high performance devices, but with less space for efficient airflow as device sizes decrease. One solution for decreasing hard disk drive operating temperature that has been explored is liquid cooling. Liquid, which is denser than air, can remove heat more efficiently and maintain a more constant operating temperature. While traditional hard disk drives cannot be submerged as they are open to the atmosphere and would allow the cooling liquid inside, damaging or destroying the hard disk drive, HGST's HelioSeal™ platform is also described by HGST as providing a cost-effective solution for liquid cooling as the drives are hermetically sealed and are described as enabling operation in most any non-conductive liquid.

More conventionally, as discussed in U.S. Patent Publication No. 2003/0179489, despite the advantages of helium-filled drives, such drives have been commercially challenged due to problems associated with leakage of gas from within the drives over time. Unlike air-filled disk drives, helium-filled drives do not include a filtered port to equalize the pressure within the drive to the ambient pressure—which ensuing pressure differential contributes to increased leakage of gas. Thus, while prior art helium drives are completely "sealed" in the conventional sense, it is still possible for helium gas therein to leak out past conventional gasket seals used to seal the cover of the disk drive to the base. Such leakage is not surprising given the relatively smaller size (i.e., lower atomic weight) of the helium atoms in comparison to the constituent gases found in air (i.e., nitrogen and oxygen). That is, the gasket seals on prior art drives allow the relatively smaller helium atoms to diffuse therethrough. However, such prior art gasket seals do not even provide hermetic seals with respect to air (i.e., the gasket seals are also permeable to the larger atoms of nitrogen and oxygen in air) since it is air that typically displaces the helium gas that leaks from the drive.

Most prior art gasket seals are only intended to keep relatively large contaminants, such as dust or smoke, from the interior of a disk drive. However, such gasket seals have been preferred as compared to other, more permanent methods of sealing a drive for two main reasons. First, such seals typically do not outgas and, thus, do not contribute to the contamination of the interior of the drive. Secondly, such seals may be reused if necessary during the assembly of the disk drive, such as when an assembled drive fails to pass certification testing and must be "re-worked." Re-working a drive typically entails removing the cover from the base and replacing a defective disk or read/write head while the drive is still in a clean room environment. The re-worked drive is then reassembled, which can even be done using the same gasket seal positioned between the base and the cover. Unfortunately, however, while such gasket seals are convenient, they simply often do not provide a sufficient hermetic seal to maintain the required concentration of helium (or other low density gas) within the disk drive for the desired service life of the drive.

In view of the potential for long-term performance problems, U.S. Patent Publication No. 2003/0179489 describes a disk drive assembly having a sealed housing. As described therein, a disc drive includes a base plate supporting a spindle motor and an actuator assembly. A structural cover is removably attached to the base plate to form an internal environment within the disc drive. The internal environment of the drive is filled with a low density gas such as helium, and a sealing cover is permanently attached to the base plate and the structural cover to form a hermetic seal that maintains a predetermined concentration of the low density gas within the internal environment over a service lifetime of the disc drive.

The disc drive further includes a first seal secured between the base plate and the structural cover to prevent contaminants from entering the internal environment of the disc drive. The first seal is formed from a material such as rubber that allows leakage of the low density gas from the internal environment at a sufficiently low rate so that the disc drive may be operated for a predetermined period of time in the absence of the sealing cover.

In one embodiment, the base plate includes a raised outer edge and the sealing cover includes a downward depending edge that is adhesively bonded within a groove formed between an outer surface of the structural cover and the raised outer edge of the base plate. Alternatively, the sealing cover may include a downward depending edge that is adhesively secured to an outer perimeter wall of the base plate. In an alternative embodiment, the sealing cover is soldered to a top surface of the raised outer edge of the base plate. Such assemblies purportedly create a hermetic seal that will maintain desired concentrations of helium (or other low density gases) within the drive over the operational lifespan of the drive (e.g., leaking helium at such a low rate that it would take over seventy years for the helium concentration to drop below a predetermined lower limit). However, such sealing covers are not without their limitations—e.g., those dimensional limitations discussed in U.S. Patent Publication No. 2003/0179489. Thus, improvements are still needed.

In addition, while U.S. Patent Publication No. 2003/0223148 (corresponding to U.S. Pat. No. 7,119,984) discusses improved containment of helium within a hard disk drive, the methods therein rely on laser-based metal sealing of such drives. Further, such "sealing" of drives is incomplete in that it does not prevent leakage through valves and ports used to inject gas into disk drive housings once sealed as such. As described therein, a base can be combined with a cover by overlapping respectively corresponding coupling flanges of the base and cover with each other. The coupling flanges are then described as being jointed and fastened together by spot welding, but only if both of the base and cover are made of metal including iron. Alternatively, hermetic sealing to some extent is said to be guaranteed if seam-welding is effected by continuously carrying out spot welding. Alternatively, when the base and the cover are made of a metal other than iron or a resin material, the coupling flanges are described as being joined together by means such as wrap-seaming, screws, or riveting. Still further, if both the base and cover are made of metal including aluminum or made of a resin material, the coupling flanges are stated to be preferably jointed and fastened together by screws or rivets. Further, in the outer peripheral portion of the jointed coupling flanges, a frame composed of a pair of L-shaped frame elements can be attached to force the jointed coupling flanges to be closed up tightly. Each of these L-shaped frame elements are made of so-called engineering plastic, e.g., polyamide resin or polyphenylene sulfide resin, and have a sectional form with a recess corresponding to the outer shape of the jointed coupling flanges. In this case, the L-shaped frame elements are fixed to the jointed coupling flanges of the housing by adhesive or by welding the frame elements per se.

Also see U.S. Pat. No. 6,762,909 for a description of laser welding of a disk drive's cover and base plate made of aluminum or other alloys. Similarly, U.S. Pat. No. 5,608,592 discusses how spot welding can be used to secure a base and cover of a disk drive housing.

U.S. Pat. No. 4,686,592 discloses a housing comprising a lower body portion and a cover portion. Lower body portion is stated to be cylindrical in shape, having a lip located towards the outer periphery and a ledge associated therewith. Cover portion is stated to have a lip portion along its outer periphery. The inner and outer diameter of the lips are selected so that the two lips nest with one another when the cover portion is placed over the lower body portion, i.e., the outer diameter of the lower body portion's lip is selected to be greater than the inner diameter of the cover portion's lip.

Further, the height of the cover portion's lip is selected with respect to the height of the lower body portion's lip so that a groove is formed for accommodating the outer periphery of the disk. Adhesives, such as epoxy, can be applied in the groove to assist in fixedly securing the disk within the groove. The disk is further secured in the groove by the clamping action provided by the cover portion and the lower body portion. Alternative methods for securing the cover portion to the lower body portion described therein include: threading, cam-locking, radial crimping, laser welding, ultrasonic welding, and the like.

U.S. Pat. Nos. 6,392,838 and 6,525,899 disclose a disk drive assembly purportedly hermetically encased within a metallic can. The metallic can comprises a top and bottom housing. Each housing component includes a sealing flange extending around its periphery. After the disk drive assembly is securely placed into the bottom housing, the top and bottom housings are mated and sealed together by forming a seam seal with the seal flanges. Also disclosed is use of a metallic gasket seal having a C-shaped cross-sectional area to purportedly hermetically seal a disk drive assembly. The C-seal includes a base layer and a plating layer, with the length of the seal extending the periphery of the disk drive base, similar to conventional elastomer gasket seals. After the disk drive cover is placed over the disk drive base and C-seal, the cover is clamped, thus compressing the C-seal. The resulting compression forces the plating layer to fill surface asperities in the area of the disk drive cover and base that contact the C-seal. These configurations purportedly provide assemblies with atmosphere leak rates of less than one cubic centimeter per $10^8$ seconds or 5% of the volume of the sealed atmosphere over ten years.

While welding, soldering, and other more permanent means of sealing a hard disk drive have proven to improve maintenance of desired concentrations of low density gases within a hard disk drive, there is a trade-off in that they typically do not facilitate efficient testing and re-working of the hard disk drives. U.S. Pat. No. 8,659,849, which is incorporated herein by reference in its entirety, describes a sealing method employing double covers in an attempt to address this issue. As background to the invention described therein, a sealing method secures a primary cover, which employs a gasket with low permeability to helium gas and is easy to disassemble and replace, to the base during testing. After successful completion of testing, a secondary cover is attached and joined to the primary cover by welding or soldering. Such a double-covered structure allows easier disassembly and re-work after testing while helium gas is hermetically enclosed in a hard disk drive.

According to U.S. Pat. No. 8,659,849, an adhesive layer is provided between the primary cover and the secondary cover to bond the primary cover to the secondary cover after initial testing and re-work of the hard disk drive. The adhesive layer is described as reinforcing the secondary cover, which is thin aluminum shaped by pressing or cutting. The periphery of the adhesive layer is smaller than the periphery of the primary and secondary covers to facilitate metal-to-metal joining of the secondary cover to the base. The joint between the base and the secondary cover is further sealed by laser welding or soldering. In order to adjust concentration of helium gas within the hard disk drive after sealing of the hard disk drive, a plug-fit through-hole is used to recharge the hard disk drive, as necessary.

U.S. Pat. No. 5,454,157 describes a disk drive assembly containing a metallic base and cover. In order to minimize escape of helium or nitrogen contained therein (via porosity in the metallic base and cover plates), a special electrostatic coating process and material called "E-coat" are used. E-coating, which is said to be a commercially available coating material and is known to be an insulative epoxy material, is applied to the surfaces of the base and cover as well as all other surfaces making up the hermetically sealed chamber. Such application of the E-coating takes place before the plates are assembled together. Every surface, inner and outer, of each plate is completely coated with a black E-coating as such. With the E-coating applied, the overall sealed chamber's porosity is purportedly lowered ninety-seven percent to an acceptable amount in order to contain the helium and nitrogen gas.

Elimination of or minimization of leakage is desired for not only better containment of gas within a hard disk drive, but for other reasons as well. One such reason relates to a reduction of complications arising from electromagnetic interference. Electromagnetic interference ("EMI," also called radio frequency interference or "RFI") is a usually undesirable disturbance caused in an electrical circuit by electromagnetic radiation emitted from an external source. Such disturbance may interrupt, obstruct, or otherwise degrade or limit the effective performance of the circuit. EMI can be induced intentionally for radio jamming, as in some forms of electronic warfare, or unintentionally, as a result of spurious emissions and responses, intermodulation products, and the like. A source of EMI may be any object, artificial or natural, that carries rapidly changing electrical currents, such as another electrical circuit or even the sun or Northern Lights. Broadcast transmitters, two-way radio transmitters, paging transmitters, and cable television are also potential sources of EMI within residential and commercial environments. Other potential sources of EMI include a wide variety of common household devices, such as doorbell transformers, toaster ovens, electric blankets, ultrasonic pest controls (e.g., bug zappers), heating pads, and touch-controlled lamps. It is known that EMI frequently affects the reception of AM radio in urban areas. It can also affect cell phone, FM radio, and television reception, although to a lesser extent. EMI can similarly affect performance of a computer.

In conventional disk drives, unwanted and potentially problematic EMI wavelengths can enter a disk drive through a number of places. For example, similar to paths of gas leakage, such wavelengths can enter disk drive housings around screws used to hold multiple components of the housing together. Junctions where components of the hard disk drive housing (e.g., cover and base) meet are another potential path of gas leakage.

Within integrated circuits, the most important means of reducing EMI including the following: the use of bypass or "decoupling" capacitors on each active device (connected across the power supply and as close to the device as possible), risetime control of high-speed signals using series resistors, and $V_{CC}$ filtering. If all of these measures still leave too much EMI, shielding such as using radio frequency (RF) gasket seals (which are often very expensive) and copper tape has been employed. Another method of reducing EMI is via use of metal hard disk drive components. While the use of metal components undesirably increases the overall weight of an apparatus, use of metal components has been conventionally mandated in the hard disk drive industry due to the EMI sensitivity of mechanical spinning components therein. Without mechanical spinning components therein, however, manufacturers of flash drives have taken advantage of the benefits of, for example, a plastic case for enclosure of the drive. See, for example, U.S. Pat. No. 7,301,776, which describes how metal material used for top and bottom plates of the drives described therein can be replaced by plastic as there are fewer EMI issues associated with flash memory devices as compared to mechanical spinning hard disk drives.

Another source of potential hard disk drive failure stems from electrostatic discharge (ESD). ESD refers to a sudden and momentary electric current that flows between two objects at different electrical potentials. The term is usually used in the electronics and other industries to describe momentary unwanted currents that may cause damage to electronic equipment. Ways to eliminate problematic ESD are in need of improvement as performance demands of hard disk drives increase.

While the aforementioned problems typically arise based on events and/or materials external to a disk drive, other problems may arise based on events and/or materials internal to a disk drive. That is, design of components within conventional disk drives can contribute to hard disk drive failure. For example, plastic components are susceptible to outgassing and components made from conductive materials are prone to shedding of particles, both of which can cause catastrophic disk failure.

In view of the number of potential problems impacting effective and long-term performance of hard disk drives, alternative methods and apparatus for improved hard disk drives are desired. Most desired are those methods and apparatus with improved efficiency and reliability over conventional attempts to provide the same.

SUMMARY OF THE INVENTION

A method of sealing a re-workable hard disk drive comprises steps of: providing a base component of a housing of the hard disk drive; providing a cover component of the housing; mating the base component and the cover component to form an enclosed housing that encloses disk drive components for facilitating reading and recording of data at any desired location on at least one disk contained within the enclosed housing; filling the enclosed housing with a desired gaseous medium; providing a cover seal; adhering the cover seal to at least a portion of an exterior surface of the cover component of the enclosed housing so that the adhesive layer of the cover seal covers the entire junction where the base and cover components of the enclosed housing meet; optionally, testing the hard disk drive; optionally, re-working the hard disk drive by first removing the cover seal; optionally, after re-working the hard disk drive, applying a new cover seal to at least a portion of an exterior surface of the cover component of the enclosed housing so that the adhesive layer on the new cover seal covers the entire junction where the base and cover components of the enclosed housing meet; and, joining the cover seal and the base component (e.g., using thermal energy) to form a sealed hard disk drive. In an exemplary embodiment, the adhesive layer of the cover seal comprises a pressure-sensitive adhesive. In an exemplary embodiment, the cover seal and the base component are metallically joined, such as by soldering.

A sealed hard disk drive of the invention comprises: a housing comprising a base and a cover; disk drive components enclosed within the housing for facilitating reading and recording of data at any desired location on at least one disk contained within the housing; and, a cover seal attached to an exterior surface of the cover of the enclosed housing so that an adhesive layer of the cover seal covers the entire seam where the base and cover components of the enclosed housing meet and a metallic joint adheres a perimeter of the cover seal to the base of the enclosed housing. According to one exemplary aspect of the invention, the sealed hard disk drive is hermetically sealed. According to another exemplary aspect of the invention, the sealed hard disk drive is waterproof.

Preferably, the enclosed housing is free of conventional gasket and other materials between the base and the cover. Advantageously, the adhesive layer of cover seals of the invention provides an easily removable temporary seal for the hard disk drive during testing and re-working of the hard disk drive. As such, conventional gaskets are unnecessary and can be effectively eliminated. The same cover seals can then be used to efficiently provide a more robust and permanent seal after testing and re-working of the hard disk drive.

BRIEF DESCRIPTION OF THE SEVERAL VIEW OF THE DRAWINGS

Note that the components and features illustrated in all figures throughout this application are not necessarily drawn to scale and are understood to be variable in relative size and placement. Similarly, orientation of many of the components and features within the figures can vary such that, for example, a horizontal configuration could be readily reoriented to a vertical configuration, and vice versa, as desired.

DETAILED DESCRIPTION OF THE PREFERRED EMBODIMENTS OF THE INVENTION

The present invention is beneficially applied in conjunction with hard disk drives (also referred to herein simply as "disk drives") in need of performance improvements. A disk drive assembly conventionally includes a base to which various components of the disk drive are mounted. A top cover (also referred to simply as a "cover") cooperates with the base to form an enclosed housing that defines an encased environment for the disk drive. The enclosed housing (also referred to herein as an "enclosed hard disk drive housing"), thus, includes an exterior surface, an interior surface, and a defined internal volume.

Any hard disk drive comprises any of a number of suitable components encased within the housing. The internal components within the disk drive include, for example, a spindle motor, which rotates one or more magnetic disks at a constant high speed, and an actuator assembly for writing information to and reading information from circular tracks on the disks. The actuator assembly typically includes a plurality of actuator arms extending towards the disks, with one or more flexures extending from each of the actuator arms. Mounted at the distal end of each of the flexures is a read/write head, which includes an air bearing slider enabling the head to fly in close proximity above the corresponding surface of the associated disk during operation of the disk drive. When the disk drive is powered down, the heads may be moved to a landing zone at an innermost region of the disks where the air bearing sliders are allowed to land on the disk surface as the disks stop rotating. Alternatively, the actuator assembly may move (unload) the heads beyond the outer circumference of the disks so that the heads are supported away from the disk surface by a load/unload ramp when the drive is powered down.

Figure 1:
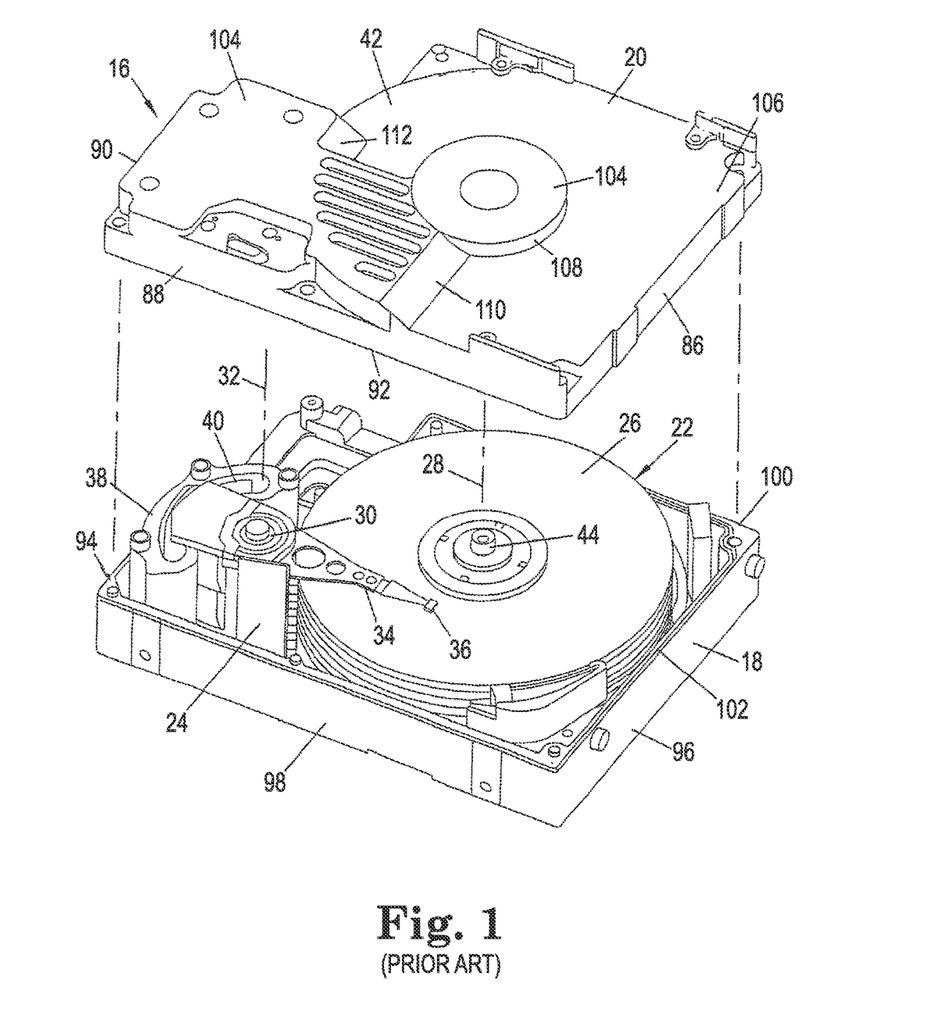
FIG. 1 is a partial perspective view of a prior art hard disk drive with the cover of the drive housing removed to illustrate certain features.

Turning now to the drawings, there is shown in FIG. 1 part of a prior art hard disk drive 16 described in U.S. Patent Publication No. 2003/0223148. The prior art hard disk drive 16 illustrated in FIG. 1 is only one example of many well-known embodiments of hard disk drives and is illustrated to show exemplary components of hard disk drives for use as a reference in conjunction with a description of the present invention. Recognize, however, that many conventional hard disk drives can be modified according to the improvements of the invention.

As shown in FIG. 1, a conventional hard disk drive 16 has a rigid outer housing including a base 18 and a cover 20. In FIG. 1, the cover 20 is removed from the base 18 to reveal a disk pack or spindle assembly 22 and a rotary actuator 24, both of which are mounted moveably with respect to the housing formed by the base 18 and cover 20. More particularly, the spindle assembly 22 includes a top disk 26 and several additional concentrically stacked and spaced-apart disks rotatable about a vertical spindle axis 28.

Rotary actuator 24 includes an actuator shaft 30 mounted to pivot relative to the base 18 about a vertical actuator axis 32. Transducer support arms, including a top support arm 34, are fixed to rotate with the actuator shaft 30. Each arm carries a magnetic data transducing head—e.g., a transducing head 36 on a support arm 34. The rotary actuator 24 pivots to move the transducing head 36 along arcuate paths generally radially with respect to the disks. Selective actuator 24 pivoting, in combination with controlled rotation of the disks, allows reading and recording of data at a desired location at any one of the disk recording surfaces. Rotary actuator 24 is pivoted by selective application of an electrical current to a voice coil 38 supported for arcuate movement within a magnetic field created by a permanent magnet arrangement 40, which includes several magnets and a poll piece (both of which are not illustrated in further detail).

The rotary actuator 24 and spindle assembly 22 are supported between two opposed housing walls, including a top wall 42 of the cover 20 and a bottom wall (not shown) of the base 18. Spindle shaft 44 and the actuator shaft 30 may be stationary—meaning that they are integral with the housing—with the disks and support arms being mounted to rotate relative to their respective shafts.

The cover 20 includes a vertical continuous sidewall structure including a rearward wall 86; two opposed sidewalls, one of which is shown at 88; and a forward wall 90. Here, the upper sidewall structure includes a generally flat, horizontal continuous bottom edge 92, though some embodiments may include a flange or other mated fitting so as to fit into a top edge 100 of base 18 facilitating a tight fit and/or laser-welding. The base 18 includes a vertical continuous sidewall structure, including a forward wall 94, a rearward wall 96, and two opposed sidewalls, one of which is shown at 98. These walls 94, 96, 98 combine to form a continuous, horizontal top edge 100. FIG. 1 also illustrates an elastomeric gasket seal 102 mounted to the top edge 100 of the base 18. When the cover 20 is assembled onto the base 18, the confronting bottom edge 92 of the cover 20 and the top edge 100 of the base 18 are brought into sealing engagement to enclose the housing about the spindle assembly 22 and the rotary actuator 24.

The upper and lower sidewalls 88, 98 are generally relatively thick to lend rigidity to the housing. The top wall 42 of the cover 20 may be formed with a horizontal full height region 104 and a horizontal recessed region 106, the two types of regions being interconnected by several non-horizontal regions as indicated at 108, 110 and 112. One portion of the full height region 104 accommodates the rotary actuator 24 and the spindle assembly 22. The non-horizontal regions 108, 110, 112 provide additional stiffness to the top wall 42 of the cover 20, which strengthens the top wall 42 and enables a somewhat reduced thickness wall construction.

During exemplary manufacture and assembly of a hard disk drive according to the invention, a base and a cover (i.e., a structural cover as opposed to a secondary sealing cover attached to an already enclosed housing) are provided and enclosed around components internal to the hard disk drive within a clean room environment to form an enclosed hard disk drive housing. Any suitable mechanism can be used to mechanically couple components (e.g., the base and cover) of the hard disk drive housing when forming the enclosed hard disk drive housing. When an electrical connector is also to be assembled such that it protrudes external to the housing, it is likewise assembled within the clean room environment. It is to be understood that an electrical connector can extend from a hard disk drive according to the invention without detracting from benefits of the invention. Any suitable mechanism can be used to mechanically couple components (e.g., a base and cover) of the hard disk drive housing.

Hard disk drives can be efficiently and effectively sealed using cover seals of the invention and without use of a conventional gasket (e.g., rubber or elastomeric gasket) or other material between the base and cover components at the interface where they meet when enclosed around components internal to the hard disk drive. This is advantageous from the standpoint of, not only eliminating cost associated with such gasket seals, but also eliminating another source of potential particulate contamination within the hard disk drive. Further, conventional sealing using material such as gaskets between base and cover components of the hard disk drive generally requires compression of the gasket to adequately seal the hard disk drive. Such compression of sealing material is not required according to the present invention.

The base and cover components of the housing comprise any suitable material. In order to facilitate metallic joining of the base and cover seal when sealing hard disk drives according to the invention, preferably the base comprises a fusible metal alloy on at least an exterior surface thereof that mates with the cover seal. After the base and cover components are enclosed around internal components to the hard disk drive and the enclosed housing is filled with a desired gaseous medium, a cover seal is adhesively attached to at least an exterior surface of the cover component (i.e., the structural cover) to seal the enclosed housing in a re-workable manner.

In one embodiment, the cover seal is adhesively attached to the entire exterior surface of the cover component on the enclosed housing. When cover seals of the invention completely conceal the cover component of the enclosed housing of the hard disk drive according to this embodiment, design flexibility is increased. For example, the cover component may be fabricated from lighter weight materials (e.g., plastic) as compared to conventional metal materials, as the metallic substrate of the cover seal provides gas containment sealing properties conventionally associated with a metallic cover component.

Although not required for effective sealing using a cover seal according to the invention, preferably, the seam (also referred to herein as the "junction") where the base and cover components meet is on a top surface of the enclosed housing according to one aspect of the invention. The cover seal not only covers the entire exterior surface of the cover component, but it also extends to cover substantially the entire exterior surface of the base that would otherwise be exposed on the top surface of the enclosed housing according to a further embodiment of this aspect of the invention. In that manner, the cover seal can be positioned similarly to the second cover described in U.S. Pat. No. 8,659,849 in that it is disposed above the cover component of the hard disk drive. The cover seal may have a plugged through-hole as described therein, or such a through-hole may be included in the base, for facilitating recharging of the gaseous medium within the enclosed housing. However, such a through-hole is not necessary and is preferably not present in cover seals according to exemplary embodiments of the invention.

Figure 2A:
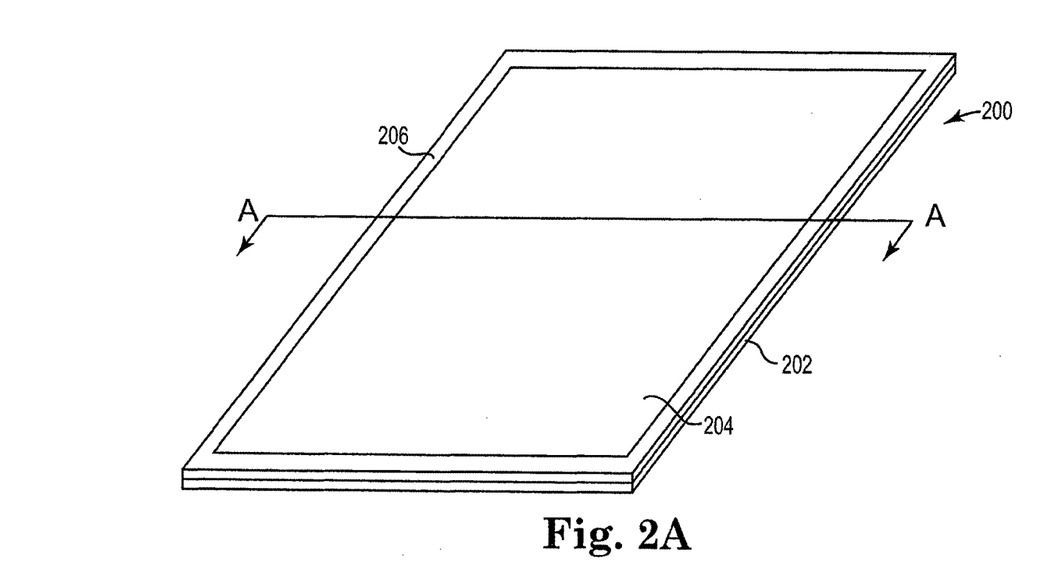
FIG. 2A is a bottom perspective view of a cover seal for a hard disk drive according to the invention.
Figure 2B:
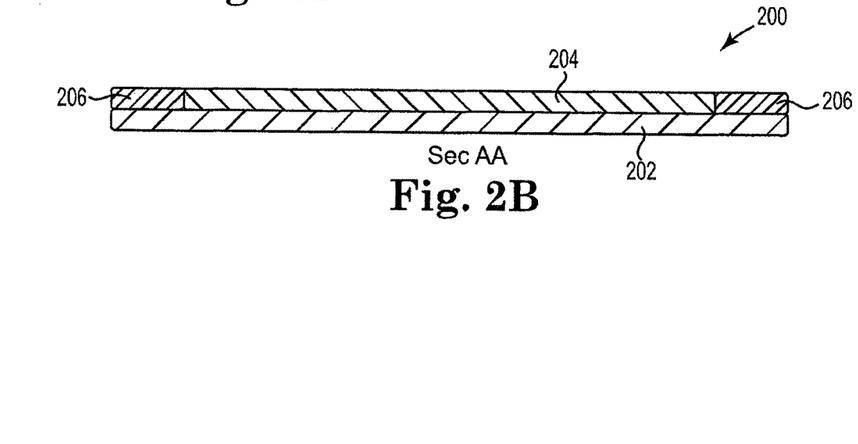
FIG. 2B is a cross-sectional view of the cover seal of FIG. 2A, taken along line A-A.

In its most basic form, as illustrated in FIGS. 2A-2B, a cover seal 200 according to the invention generally includes a metallic substrate 202 with an outwardly exposed adhesive layer 204 (e.g., a pressure-sensitive adhesive) on at least a portion of one major surface thereof thereof. Metallic substrates 202 of the invention comprise any suitable metal, including aluminum, chrome, copper, stainless steel, and nickel. In a preferred embodiment, the metallic substrate 202 comprises a metal selected from aluminum and stainless steel.

In a preferred embodiment, the metallic substrate 202 takes the form of a metal foil. For example, in one embodiment, the metallic substrate 202 is a metal foil (e.g., a dead soft aluminum foil—i.e., a foil possessing the ability to conform to a potentially non-perfectly flat surface). A wide variety of metal foils are commercially available. For example, a variety of suitable aluminum foils are available from A.J. Oster Foils, Inc. (Alliance, Ohio).

Advantageously, as compared to conventional secondary covers used to seal hard disk drives, cover seals 200 according to the invention are flexible and conformable due to the use of a relatively thin metallic substrate 202 (e.g., metal foil exhibits ductile behavior and promotes conformability). These properties facilitate adequate contact between mating surfaces, which is beneficial to both temporary and permanent sealing processes (e.g., facilitating conformability of the adhesive layer 204 and adhesive-free border of the cover seal 200 to a mating surface).

In a further embodiment, the metallic substrate 202 consists of a reactive, multi-layer foil having at least two adjacent metallic layers. For example, Indium Corporation (Elk Grove Village, Ill.) provides reactive, multi-layer foils under the trade designation, NanoFoil. Such reactive, multi-layer foils are fabricated by vapor-depositing thousands of alternating nanoscale layers of aluminum (Al) and nickel (Ni). When activated by a small pulse of local energy from electrical, optical, or thermal sources, the foil reacts exothermically to precisely deliver localized heat in fractions (e.g., thousandths) of a second.

In yet a further embodiment, the metallic substrate 202 comprises a metal foil laminate comprising a metal barrier layer (e.g., aluminum or stainless steel) adhesively bonded to a polymer layer (e.g., polyester). Within such a metal foil laminate, the metal barrier layer is about 1-1.5 mils (25.4-38.1 microns) thick, but can be thicker if desired, and the polymer layer is about 1 mil (25.4 microns) thick.

In another embodiment, the metallic substrate 202 takes the form of a metal coating. For example, a metallic substrate 202 comprising a metal coating can be formed on an outwardly exposed protective layer (not shown, but on a side of the metallic substrate 202 opposite from the adhesive layer 204) during fabrication of the cover seal 200.

Metal coatings can be formed using any suitable methodology, preferably using vacuum deposition, including, for example, spray coating (e.g., plasma coating), sputter coating, or plating techniques, as known to those of ordinary skill in the art. For example, the number and duration of passes using sputter coating equipment can vary depending on the nature of the metal, component, and desired properties. Multiple passes to form multiple contiguous layers was found to reduce or eliminate potential problems associate with pinholes or other defects often found in metal coatings. As such, formation of a metal coating using multiple passes is preferred. For example, at least two sputter coating passes, each pass forming a coating having an optical density of about 2.8, can be used to form an adequate metal coating according to one embodiment of the invention. Any material capable of being deposited or plated may be coated using technologies known to those of ordinary skill in the art. For example, any sputter coating target material may be used to form the metal coating.

As used herein, a metal coating is defined as a single layer or multiple contiguous layers of essentially the same metal. The metal coating may be a continuous layer or a discontinuous layer or multiples thereof. Further, the thickness of the metal coating can vary according to properties desired. For ease of manufacture, however, it is often preferred that the metal coating is a uniformly thick coating of the same metal.

In one embodiment, the metal coating comprises at least two individual layers. In another embodiment, the metal coating comprises at least about four individual layers. In still another embodiment, the metal coating comprises at least about six individual layers. In yet another embodiment, the metal coating comprises at least about ten individual layers. Understand that each individual layer need not be the same thickness or type of metal; although, uniformity thereof is often preferred for process simplicity.

As discussed above, preferably the metal coating comprises multiple layers in order to minimize the possibility of pinholes or other defects negatively impacting shielding or containment properties of the hard disk drive. In those embodiments where containment of inert gas within the hard disk drive is of particular concern, metal coatings preferably comprise more and/or thicker layers. When multiple layers are used, for example, the chance of defects resulting in through paths for undesired electromagnetic interference and gaseous particles is minimized. The through transmission rate for such particles is essentially zero according to preferred embodiments. Preferably, the leakage rate for helium particles through cover seals of the invention is less than about $3 \times 10^{-9}$ Pa·m$^3$/sec.

While equipment and methodology for formation of metal coatings can be costly and require tightly controlled processing parameters, as compared to coating of a hard disk drive described in U.S. Patent Publication No. 2012/0275105 A1, any metal coating in cover seals 200 of the invention is not part of the basic hard disk drive manufacturing process. Rather, cover seals 200 are prepared and typically stored for later use. Thus, use of metal coatings in metallic substrates 202 of the invention does not negatively affect efficiency of the basic hard disk drive manufacturing process by requiring that the hard disk drive itself be subjected to the coating equipment and methodology.

In an exemplary embodiment, the metallic substrate 202 has a thickness of less than about 100 microns, preferably less than about 40 microns. In a preferred embodiment, the metallic substrate 202 has a thickness of about 25 microns. Use of such a relatively thin metallic substrate 202 contributes to its conformability within cover seals 200 of the invention. For example, conformability of the metallic substrate 202 facilitates intimate contact thereof with the adhesive layer 204, so that gaps are minimized or, preferably, eliminated therebetween. Such conformability improves sealing properties and also facilitates effective use of cover seals 200 of the invention in sealing hard disk drives having curved or other non-planar surfaces.

The metallic substrate 202 may be constrained (i.e., the metallic substrate 202 is positioned between additional continuous or discontinuous non-adhesive layers on both sides thereof) or non-constrained (i.e., no additional non-adhesive layers surround both sides of the metallic substrate 202). When present, in a preferred embodiment, a constrained metallic substrate comprises a metal coating constrained by first and second polymeric layers. The first and second polymeric layers each comprise any suitable material and thickness. Each of the first polymeric layer and the second polymeric layer need not comprise the same material. Similarly, each of the first polymeric layer and the second polymeric layer need not have the same thickness. In an exemplary embodiment, however, each of the first and second polymeric layers comprises polyurethane and has a thickness of about 5 microns to about 10 microns.

The first and second polymeric layers assist in minimizing, and preferably eliminating, development of cracks in the constrained metallic substrate, which is generally thinner than non-constrained metallic substrates used in cover seals 200 of the invention, especially when non-constrained metallic substrates comprise a metal foil. As is understood by those of ordinary skill in the art, cracks within a metallic substrate 202 have the potential to negatively affect sealing properties of the cover seal 200. Nevertheless, in order to further guard against potential negative effects from development of cracks within metallic substrates 202 of the invention, use of both a first non-constrained metallic substrate and a constrained metallic substrate for redundancy within a cover seal can potentially be advantageous. In those embodiments, the first non-constrained metallic substrate preferably takes the form of a metal foil.

As illustrated in FIG. 2A, an adhesive-free border comprising a fusible metal alloy layer 206 surrounds the adhesive layer 204. The adhesive-free border is less than about 500 mm, less than about 1 mm, or less than about 500 microns in width according to various exemplary embodiments. While width of the border varies according to form factor of the hard disk drive and other factors, for example, in one embodiment, the adhesive-free border is about 1-2 mils (25-50 microns) wide.

During fabrication of the cover seal 200, the fusible metal alloy layer 206 may be applied to the metallic substrate 202 using any suitable method and at any time prior to application of the cover seal 200 to an enclosed hard disk drive housing. While application of the fusible metal alloy layer 206 to the entire metallic substrate 202 is less complicated from a manufacturing perspective, application of a fusible metal alloy layer 206 to the periphery of the metallic substrate 202 (i.e., as illustrated in FIGS. 2A-2D) is all that is required for effective sealing of hard disk drives according to the invention.

Cover seals of the invention preferably comprise enough fusible metal alloy to effectively and more permanently seal the hard disk drive after any testing and re-work thereof. Alternatively, however, a cover seal of the invention is essentially free of fusible metal alloy, or essentially free of an effective amount of fusible metal alloy to more permanently seal the hard disk drive after any testing and re-work thereof. In those embodiments, the base component of the hard disk drive that mates with an adhesive-free border on the cover seal, alone or in combination with any fusible metal alloy present on the adhesive-free border, comprises an effective amount of fusible metal alloy to facilitate metallic joining of the cover seal with the base of an enclosed hard disk drive housing.

Figure 2C:
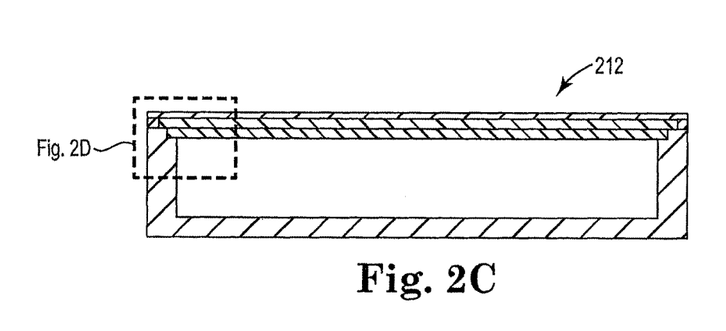
FIG. 2C is a cross-sectional view of the cover seal of FIG. 2A, as viewed along line A-A, attached to a hard disk drive housing shown in block diagram form.
Figure 2D:
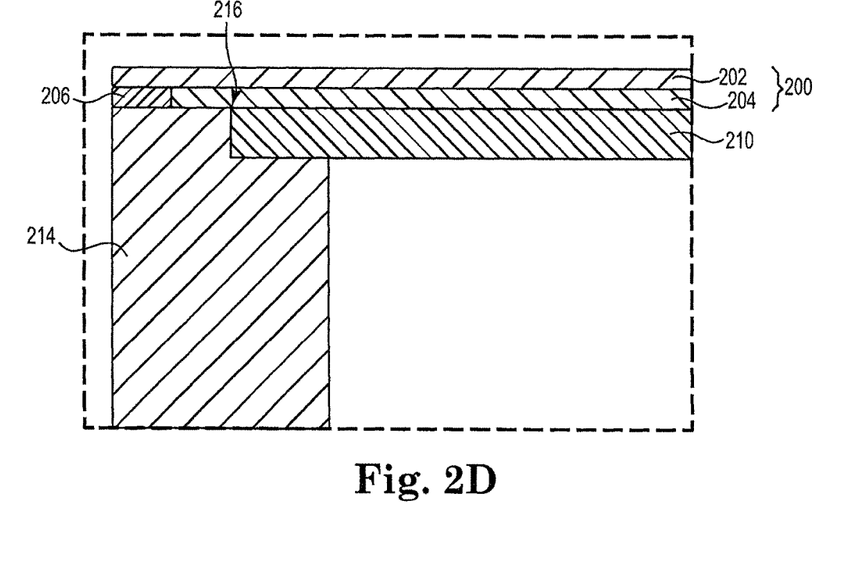
FIG. 2D is a partial exploded view of FIG. 2C.

Cover seals 200 of the invention preferably include a fusible metal alloy 206 adjacent the metallic substrate 202 at each position thereon where a metallic joint is to be formed when metallically sealing the cover seal 200 to the base 214 of the enclosed hard disk drive housing 212 after re-working of the hard disk drive. The fusible metal alloy 206 is distinct from the metallic substrate 202 referenced herein. Note that the fusible metal alloy 206 is not taken into account in the above discussion of constrained and non-constrained metallic substrates.

To facilitate metallic sealing of the cover seal 200 to the base 214 of the enclosed hard disk drive housing 212, preferably the metallic substrate 202 is pre-treated on at least a portion of one major surface thereof by, for example, applying a layer of a fusible metal alloy (e.g., solder) having a lower melting point than that of the metallic substrate 202. Those of ordinary skill in the art are readily familiar with methodology for forming a layer of a fusible metal alloy. Depending on materials involved, this methodology is often referred to as "pre-tinning" or "pre-plating." Any suitable methodology that facilitates effective metallic sealing of the cover seal 200 to the base 214 may be used.

According to an exemplary embodiment, the metallic substrate 202 is pre-treated on at least one entire major surface with a fusible metal alloy 206 of a thickness sufficient to form a desired metallic joint. Although the fusible metal alloy 206 need only be present at those portions of the metallic substrate 202 adjacent the metallic joint to be formed, pre-treating at least one entire major surface advantageously eliminates or minimizes the need for specialized equipment otherwise needed for patterned application of the fusible metal alloy to only a portion of a major surface of the metallic substrate 202.

The metallic substrate 202 can be pre-treated in a continuous or discontinuous manner. The only portions of the metallic substrate 202 that need be pre-treated according to a preferred embodiment are those portions of the metallic substrate 202 adjacent the metallic joint to be formed with the base of the enclosed hard disk drive housing. If desired, although not required in all embodiments, pre-treating of the hard disk drive components with the fusible metal alloy at portions where the metallic joint is to be formed may be done as well.

At portions where a metallic joint is to be formed, thickness of the fusible metal alloy layer 206 can vary, but is generally selected so that the cover seal 200 can be effectively metallically sealed to the base 214 of the enclosed hard disk drive housing 212 at desired portions thereof. For example, thickness of the fusible metal alloy layer 206 is large enough to facilitate adequate wetting of the fusible metal alloy 206 on facing portions of the base 214 where a metallic joint is to be formed. Thickness of the fusible metal alloy layer 206 is also small enough so that wetting of the fusible metal alloy 206 on facing portions of the base 214 where a metallic joint is to be formed can effectively occur by capillary action. In an exemplary embodiment, thickness of the fusible metal alloy layer 206 is at least about 20% of thickness of the adjacent metallic substrate 202 on which it is applied.

In one embodiment, thickness of the fusible metal alloy layer 206 is at least about 16 microns at any portion of the cover seal 200 where metallic sealing is desired. According to a further embodiment, thickness of the fusible metal alloy layer 206 is at least about 25 microns at any portion of the cover seal 200 where metallic sealing is desired. According to yet a further embodiment, thickness of the fusible metal alloy layer 206 is at least about 50 microns at any portion of the cover seal 200 where metallic sealing is desired. According to still yet a further embodiment, thickness of the fusible metal alloy layer 206 is at least about 75 microns at any portion of the cover seal 200 where metallic sealing is desired. Thickness of the fusible metal alloy layer 206 can be adjusted to factor in thickness of any fusible metal alloy layer present, if any, on adjacent hard disk drive components to which the cover seal 200 is to be metallically joined. For example, a fusible metal alloy layer(s) 206 having a combined thickness of about 75 microns to about 250 microns at a position where a metallic joint is desired was found to make for strong metallic joints.

The adhesive layer 204 provides a temporary seal over the junction formed between the base and cover when they are enclosed around components internal to the hard disk drive to form the enclosed housing. The adhesive layer 204 not only maintains a desired concentration of a gaseous medium within the hard disk drive while it is being tested, but it can be easily removed to separate the base and cover of the hard disk drive when re-work is needed. If the hard disk drive does not need to be re-worked, the cover seal remains in place and is subsequently joined to the base via metallic joining. While the adhesive layer 204 on the cover seal 200 may not function as the primary seal once the cover seal 200 is joined to the base as such, the cover seal 200 is positioned over the entire seam between the cover and base once the cover seal 200 is applied to an enclosed housing to function as a temporary seal.

The adhesive layer 204 is outwardly exposed on the cover seal 200 and comprises any suitable base material and additives. In one embodiment, the adhesive layer 204 generally comprises a base polymer with one or more additives. While any suitable chemistry can be used for the base polymer in the adhesive layer 204, (meth)acrylate (i.e., acrylate and methacrylate) chemistry is preferred. In particular, an adhesive based on 2-ethyl hexyl acrylate, vinyl acetate, and acrylic acid monomers polymerized as known to those skilled in the art can be used as the base polymer. However, other suitable chemistries are known to those skilled in the art and include, for example, those based on synthetic and natural rubbers, polybutadiene and copolymers thereof, and polyisoprene and copolymers thereof. In a preferred embodiment, to promote self-adherence of the adhesive layer 204 to the enclosed hard disk drive housing 212, the adhesive layer 204 comprises a pressure-sensitive adhesive (PSA).

The adhesive layer 204 comprises any suitable thickness. In one embodiment, the adhesive layer 204 has a thickness of about 5 microns to about 150 microns. In an exemplary embodiment, the adhesive layer 204 is about 50 microns thick or less (e.g., the adhesive layer 204 is about 1-1.5 mils (25.4-38.1 microns) thick). In another exemplary embodiment, the adhesive layer 204 is about 25 microns thick or less. However, the thickness of the adhesive layer 204 can vary substantially without departing from the spirit and scope of the invention.

The adhesive layer 204 may be applied using any suitable method. For example, the adhesive layer 204 may be screen-print, sprayed, or applied to the metallic substrate 202 using a needle-like dispensing tube. A preferred method of applying the adhesive layer 204 to the metallic substrate 202 is to selectively die cut and precision place the adhesive layer 204 onto the metallic substrate 202. The adhesive layer 204 need only cover that portion of the metallic substrate 202 where the cover seal 200 will cover the seam between the base and cover components of an enclosed housing over which it is applied. Preferably, where screws or other metallic components are present on the exterior surface of the cover component (e.g., where a screw for the spindle motor mount is positioned), essentially no adhesive layer 204 is present on the cover seal 200 so that it is possible for the metallic substrate 202 to form a metallic joint (e.g., by soldering) with that portion of the cover component to further improve hermetic sealing thereof as compared to application of conventional sealing tapes and compounds thereover.

The adhesive layer 204 may be substantially continuous or discontinuous. For example, the adhesive layer 204 comprises multiple islands of adhesive on the metallic substrate 202 according to one embodiment. The islands are spaced apart on the metallic substrate 202 in an essentially uniform manner according to one variation of this embodiment. According to another variation of this embodiment, the islands are spaced apart on the metallic substrate 202 in an essentially non-uniform manner. Nevertheless, the metallic substrate 202 is essentially free of outwardly exposed adhesive layer and other materials (e.g., solder-resistant materials) not conducive to metallic sealing at those portions of the metallic substrate 202 corresponding where a metallic joint is to be formed when the cover seal 200 is sealed to the enclosed hard disk drive housing 212.

When present, an outwardly exposed protective layer functions to protect the metallic substrate 202 from damage, but its presence in cover seals 200 of the invention is optional. Any suitable material may be used for the optional outwardly exposed protective layer. In an exemplary embodiment, the outwardly exposed protective layer comprises at least one of polyester, polyurethane, polyolefin, and thermoplastic elastomer (e.g., that sold by DuPont under the HYTREL trade designation) components. Due to its preferential resistance to punctures, for example, polyurethane is a preferred material for the outwardly exposed protective layer.

If present, the outwardly exposed protective layer comprises any suitable thickness. In an exemplary embodiment, the outwardly exposed protective layer has a thickness of about 25 microns to about 100 microns. In another embodiment, the outwardly exposed protective layer has a thickness of about 20 microns to about 50 microns. In a further embodiment, the outwardly exposed protective layer has a thickness of about 25 microns to about 40 microns.

In order to adequately adhere multiple layers within the cover seal 200, when present, a laminating adhesive layer may be present between, for example, the optional outwardly exposed protective layer and the first polymeric layer constraining the constrained metallic substrate. Similarly, a laminating adhesive layer may be present between, for example, the first metallic layer and the second polymeric layer constraining the constrained metallic substrate. Any suitable adhesive can be used for such laminating adhesive layers, each of which may not comprise the same chemistry and/or thickness.

According to one embodiment, a laminating adhesive layer generally comprises a base polymer with one or more suitable additives. While any suitable chemistry can be used for the base polymer, (meth)acrylate (i.e., acrylate and methacrylate) chemistry is preferred. In particular, an adhesive based on 2-ethyl hexyl acrylate, vinyl acetate, and acrylic acid monomers polymerized as known to those skilled in the art can be used as the base polymer. However, other suitable chemistries are known to those skilled in the art and include, for example, those based on synthetic and natural rubbers, polyurethane, polyester, polybutadiene and copolymers thereof, and polyisoprene and copolymers thereof. In one embodiment, the laminating adhesive layer comprises a pressure-sensitive adhesive (PSA).

If used, laminating adhesive layers comprise any suitable thickness. In one embodiment, the laminating adhesive layers each have a thickness of less than about 5 microns (e.g., about 2 microns).

Thickness of each of the layers within cover seals 200 of the invention may vary, individually and in combination. Maximum combined thickness of the layers in cover seal 200 of the invention is at least about 40 microns in one embodiment. In a further embodiment, the maximum combined thickness is at least about 50 microns. In yet a further embodiment, the maximum combined thickness is at least about 200 microns. As thickness increases, durability increases, but conformability generally decreases. In an exemplary embodiment, in order to balance these competing Recognize, however, that additional layers may be included on exterior surfaces of the cover seal 200 and removed before adhering the cover seal 200 to an enclosed hard disk drive housing according to the invention. For example, a temporary release liner or similar temporary protective material may be present to protect the otherwise outwardly exposed adhesive layer 204 from particulate contamination and unwanted adherence of the same before the cover seal is adhered to an enclosed hard disk drive housing. Before adherence of the cover seal, the temporary release liner or similar temporary protective material, if present, is first removed.

The cover seal 200 is sized so that the entire cover seal 200 flexibly conforms to the cover and extends across the junction between the base and cover of an enclosed hard disk drive housing 212. When sized according to an exemplary aspect of the invention, at least one of the length and the width of the cover seal 200 is at least one-hundred times the thickness of the cover seal 200. In a further embodiment, at least one of the length and the width of the cover seal 200 is at least one-thousand times the thickness of the cover seal 200.

The invention is not limited to adherence of cover seals to enclosed hard disk drive housings of any particular size and can be used with any type of hard disk drive. Recognize that hard disk drives often exist in one or more standard form factors, which form factors can vary in height (e.g., full height, half-height, low-profile, and ultra-low-profile). For illustration purposes only, Table 1 illustrates several widely used form factors for personal computer hard disk drives and associated dimensions (where "SA" refers to surface area). Several other form factors are known, including PC Card (PCMCIA) and CompactFlash form factors, for example.

TABLE 1

| Form Factor | Width (in/mm) | Depth (in/mm) | Height (in/mm) | Vol. of Form Factor (cu. in/cm$^3$) | Overall SA of Form Factor (sq. in/cm$^2$) | SA of xy-Plane (sq. in/cm$^2$) | SA of xz-Plane (sq. in/cm$^2$) | SA of yz-Plane (sq. in/cm$^2$) |
|---|---|---|---|---|---|---|---|---|
| 2.5-inch, 12.5-mm Height | 2.75/ 69.85 | 3.94/ 100.08 | 0.49/ 12.45 | 5.31/ 87.01 | 28.23/ 182.13 | 10.84/ 69.94 | 1.93/ 12.45 | 1.35/ 8.71 |
| 2.5-inch, 9.5-mm Height | 2.75/ 69.85 | 3.94/ 100.08 | 0.37/ 9.40 | 4.01/ 65.71 | 26.62/ 171.74 | 10.84/ 69.94 | 1.46/ 9.42 | 1.02/ 6.58 |
| 3.5-inch Half-Height | 4.00/ 101.60 | 5.75/ 146.05 | 1.63/ 41.40 | 37.49/ 614.35 | 77.79/ 501.87 | 23.00/ 148.39 | 9.37/ 60.45 | 6.52/ 42.06 |
| 3.5-inch Low Profile | 4.00/ 101.60 | 5.75/ 146.05 | 1.00/ 25.40 | 23.00/ 376.90 | 65.50/ 422.58 | 23.00/ 148.39 | 5.75/ 37.10 | 4.00/ 25.81 | properties, the combined maximum thickness is about 50 microns to about 75 microns.

When the cover seal 200 includes non-metallic layers in addition to the outwardly exposed adhesive layer 204 (e.g., the optional outwardly exposed protective layer, internal laminating adhesives, or polymeric layers encompassed by a constrained metallic substrate), those non-metallic layers are eliminated from those portions of the metallic substrate 202 at a position where a metallic joint is to be formed with the base 214 of the enclosed hard disk drive housing 212.

As noted above, in one embodiment, a cover seal of the invention not only covers the entire exterior surface of the cover component, but it also extends to cover substantially the entire exterior surface of the base that would otherwise be exposed on the top surface of the enclosed housing. Thus, according to that embodiment, length and width of an adequately sized cover seal for a hard disk drive of a particular form factor would approximate depth and width of the hard disk drive for each representative form factor listed in Table 1.

In one embodiment of a method of assembling and testing a hard disk drive, the base and the cover are enclosed around internal components to the hard disk drive in an environment filled with the desired gaseous medium (when the desired medium is other than atmospheric air). In another embodiment, after enclosing the base and the cover around internal components to the hard disk drive, the hard disk drive is evacuated and filled with the desired gaseous medium (when the desired medium is other than atmospheric air). A fill port or other conventional methodology can be used for filling the hard disk drive with the desired gaseous medium.

The cover seal 200 is then adhered to the cover 210 of an enclosed housing of a hard disk drive 212 via the adhesive layer 204, as illustrated in FIGS. 2C-2D. The adhesive layer 204 on the cover seal 200 covers the junction 216 where the base 214 and cover 210 components of the enclosed housing meet. The temporary seal provided by the adhesive layer 204 is generally sufficient to maintain desired concentration of the gaseous medium within the hard disk drive 212 during routine testing and re-working. Advantageously, by using such a seal, conventional gasket seals can be eliminated. Further, re-workability is facilitated by use of readily removable adhesives, such as pressure-sensitive-adhesives, for the adhesive layer 204 of the cover seal 200.

The hard disk drive 212 then preferably undergoes routine testing and re-working, if necessary. If re-working is required, the cover seal 200 is easily removed from the enclosed housing and a new cover seal can be applied as before to the re-worked housing. Once the hard disk drive 212 passes such testing, the adhesive-free border of the cover seal 200 is more permanently attached to the base component 214 of the hard disk drive 212 (i.e., it is joined to the base via a metallic joint) such that the hard disk drive is metallically sealed using any suitable method.

Methodology for metallic sealing via brazing and soldering and materials (e.g., fusible metal alloys, as described above) therefor are well known to those of ordinary skill in the art. Fusible metal alloys (e.g. solder) used in the invention have a liquidus temperature below the melting point of the metallic substrate within cover seals of the invention. Any suitable fusible metal alloy can be used according to the invention. For example, solder used according to the invention can be a hard solder or soft solder. According to one embodiment, a soft solder is used for metallic sealing according to the invention. A soft solder has a liquidus temperature of 90° C. to 450° C. (190° F. to 840° F.). In contrast, a hard solder has a liquidus temperature of greater than 450° C. (840° F.). In a preferred embodiment, a soft solder used for metallic sealing according to the invention has a liquidus temperature of 180° C. to 190° C. (360° F. to 370° F.).

For improved efficiency in certain applications, a eutectic solder is selected and used for metallic sealing according to the invention. A eutectic solder has a melting point in that it melts at an essentially single temperature. In contrast, non-eutectic solder has markedly different solidus and liquidus temperatures and, hence, no defined melting point. Within the temperature range (i.e., melting interval) between the solid and liquid phases, a non-eutectic alloy solder generally exists as a paste of solid particles in a melt of the lower-melting phase within the alloy (i.e., a solder paste).

According to one embodiment, a solder paste is used for metallic sealing according to the invention. In general, fusible metal alloy layers can be formed from solder pastes using, for example, stencil printing and jet dispensing technologies and equipment. Equipment for jet dispensing of solder is commercially available from MYDATA automation, Inc. (Rowley, Mass.) as, for example, the MY600 Jet Printer. Solder pastes are commercially available from, for example, AIM Metals and Alloys LP (Cranston, R.I.). Exemplary solder pastes available from AIM Metals and Alloys LP include a tin-lead, no-clean solder paste having the trade designation, NC257MD Sn63. This exemplary solder paste is described as being applicable to a substrate using a jet printer, which is advantageous in certain embodiments.

Alloys of lead and tin are common for soft solder and are particularly convenient for hand-soldering. Lead-free solder, while somewhat less convenient for hand-soldering, is often used to avoid the environmental effect of lead. Lead-free solder according to the invention conforms to the European Union's Waste Electrical and Electronic Equipment Directive (WEEE) and Restriction of Hazardous Substances Directive (RoHS). Exemplary lead-free solder may contain two or more of tin, copper, silver, bismuth, indium, zinc, antimony, and traces of other metals. According to one embodiment, a lead-free solder is used for solder-sealing according to the invention. Lead-free solders are also commercially available from, for example, AIM Metals and Alloys LP (Cranston, R.I.). Exemplary solders available from AIM Metals and Alloys LP include a lead-free, no-clean solder paste having the trade designation, NC257-2.

Superior Flux & Mfg. Co. (Cleveland, Ohio) is a commercial supplier of a variety of solder materials. Alloys of indium, such as those available from Indium Corporation (Elk Grove Village, Ill.), are often preferred due to their generally lower liquidus temperature than that associated with other soft solders.

Fusible metal alloys are also available in powder form, which may optionally include a minor amount of a binder effective to facilitate coalescence of the solder. In one embodiment, fusible metal alloy in powder form is applied to the metallic substrate and then fused (e.g., by heating the alloy) to the metallic substrate.

In addition to paste and powder forms, fusible metal alloys may be provided in other forms. For example, solder wire is available in a range of thicknesses and with cores containing flux. Fusible metal alloys can be applied to a substrate using any suitable technology (e.g., jet printing, cladding, hot dipping, reflowing, vapor deposition, electroplating, and electroless plating). Materion Technical Materials (Lincoln, R.I.) has several coatable solders available. Fusible metal alloys are also available as a preform shaped to match the workpiece.

According to one embodiment, a preform is used for metallic sealing according to the invention. A preform is a pre-made shape of fusible metal alloy specially designed for the application where it is to be used. The preform can be plain or can include a flux for the metallic sealing process as an internal flux (i.e., with flux inside the preform) or external flux (i.e., with the preform coated with the flux). Any suitable method can be used to manufacture the preform. For example, a preform can be made by stamping solder ribbon/strip that has been rolled to the specific thickness of the application. Array Solders (Kearny, N.J.), Indium Corporation (Elk Grove Village, Ill.), and other commercial suppliers can be utilized to make such preforms and often provide fusible metal alloys in other forms suitable for use according to the present invention. For example, Indium Corporation provides Clad Solder Preforms, which consist of a copper layer clad on one or both sides with a specified thickness of solder.

Any suitable methodology and equipment can be used for positioning/placement of the fusible metal alloy, some of which are described above. The metallic substrate may also be obtained commercially in a pre-treated form. Suppliers of such pre-treated metallic layers include, for example, Orbel Corporation (Easton, Pa.) and Aurubis (Buffalo, N.Y.). If a thicker fusible metal alloy layer is desired than what is present on such commercially obtained pre-treated metallic substrates, additional fusible metal alloy can be added thereto.

At least one fusible metal alloy is positioned on or adjacent at least one portion of the metallic substrate where a metallic joint is to be formed. The alloy is then fused, generally by application of heat at a temperature higher than the liquidus temperature of the alloy, to metallically seal the cover seal to the enclosed hard disk drive housing.

During metallic sealing of the cover seal 200, structural integrity of the metallic substrate 202 remains beneficially uncompromised. That is, unlike within welded joints, the original interfacial division is maintained between the metallic substrate of the cover seal and adjacent metallic portions of the enclosed hard disk drive housing to which it is joined within metallic joints of the invention. Maintenance of the original interfacial division at those adjacent portions can be confirmed by viewing the same with the aid of a microscope. Again, it is to be understood that metallic sealing of the invention is differentiated from welding in that the metallic substrate within cover seals of the invention does not melt when metallically sealing a hard disk drive.

Advantages associated with hard disk drives and related methods of the present invention include improved process efficiency and improved containment of a gaseous medium within an enclosed hard disk drive. Within the sealed environment of hard disk drives of the invention, a gas having a density less than that of atmospheric air can be effectively employed. For example, a gaseous medium comprising at least one of hydrogen, nitrogen, helium, or other noble gases can be employed therein, alone or in combination with one or more of each other and/or air.

In an exemplary embodiment, an improved hard disk drive of the invention is capable of providing and maintaining an adequate sealed environment for at least five years. An adequate sealed environment is one in which hard disk drive performance is not significantly affected due to leakage. According to one embodiment, at least about 90% by volume, preferably at least about 95% by volume, of a gaseous medium originally contained within a hard disk drive remains after ten years. Any suitable methodology can be used to detect leakage of a gaseous medium from a hard disk drive and amounts thereof.

According to one aspect of the invention, sealed hard disk drives of the invention are hermetically sealed to maintain a predetermined concentration of a low density gas within the internal environment of the hard disk drive over a service lifetime of the drive (e.g., leaking helium at such a low rate that it would take over seventy years for the helium concentration to drop below a predetermined lower limit selected according to the minimum concentration of helium needed for acceptable performance).

Various modifications and alterations of the invention will become apparent to those skilled in the art without departing from the spirit and scope of the invention, which is defined by the accompanying claims. While the present invention has been described with respect to a hard disk drive, it should be understood that the present invention also finds utility in other data storage devices—e.g., optical and magneto-optical storage devices.

It should be noted that steps recited in any method claims below do not always necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language. Further, as used throughout, ranges may be used as shorthand for describing each and every value that is within the range. Any value within the range can be selected as the terminus of the range. Similarly, any discrete value within the range can be selected as the minimum or maximum value recited in describing and claiming features of the invention. Finally, any material or performance properties described or measured herein are those existing at room temperature and atmospheric pressure unless specified otherwise.

The invention claimed is:

1. A method of sealing a re-workable hard disk drive, comprising steps of:
providing a base component of a housing of the hard disk drive;
providing a cover component of the housing;
mating the base component and the cover component at a junction to form an enclosed housing that encloses disk drive components for facilitating reading and recording of data at any desired location on at least one disk contained within the enclosed housing, wherein the enclosed housing is free of conventional gasket and other materials between the base component and the cover component;
filling the enclosed housing with a desired gaseous medium;
providing a cover seal, wherein the cover seal comprises a metallic substrate and an outwardly exposed adhesive layer on at least a portion of a major surface thereof;
adhering the cover seal to at least a portion of an exterior surface of the cover component of the enclosed housing so that the adhesive layer of the cover seal covers the entire junction where the base and cover components of the enclosed housing meet;
optionally, testing the hard disk drive;
optionally, re-working the hard disk drive by first removing the cover seal;
optionally, after re-working the hard disk drive, applying a new cover seal to at least a portion of the exterior surface of the cover component of the enclosed housing so that the adhesive layer on the new cover seal covers the entire junction where the base and cover components of the enclosed housing meet; and
metallically joining the cover seal and the base component to form a sealed hard disk drive.

2. The method of claim 1, wherein the adhesive layer of the cover seal comprises a pressure-sensitive adhesive.

3. The method of claim 1, wherein the cover seal and the base component are metallically joined by soldering.

4. The method of claim 1, wherein the cover seal and the base component are metallically joined using lead-free solder.

5. The method of claim 1, wherein the cover seal and the base component are metallically joined using a eutectic solder.

6. The method of claim 1, wherein the cover seal and the base component are metallically joined using a fusible metal alloy having a lower melting point than that of the metallic substrate of the cover seal.

7. The method of claim 1, wherein the cover seal comprises a fusible metal alloy.

8. The method of claim 1, wherein the cover seal comprises a fusible metal alloy layer comprising an adhesive-free border on the cover seal and having a thickness of at least about 16 microns.

9. The method of claim 1, wherein the base component comprises a fusible metal alloy on at least an exterior surface thereof that mates with the cover seal.

10. The method of claim 1, wherein the cover seal and the base component are metallically joined using a fusible metal alloy layer(s) having a combined thickness of about 75 microns to about 250 microns at a position where a metallic joint is desired.

11. The method of claim 1, wherein the cover seal is adhesively attached to the entire exterior surface of the cover component of the enclosed housing.

12. The method of claim 1, wherein a through-hole for facilitating recharging of the gaseous medium within the enclosed housing is not present in the cover seal.

13. The method of claim 1, wherein the metallic substrate has a thickness of less than about 100 microns.

14. The method of claim 1, wherein the metallic substrate takes the form of a metal foil.

15. The method of claim 14, wherein the metal foil is a dead soft aluminum foil.

16. The method of claim 1, wherein the cover seal is flexible and conformable.

17. The method of claim 1, wherein at least one of length and width of the cover seal is at least about one-hundred times thickness of the cover seal.

18. The method of claim 1, wherein the metallic substrate comprises a reactive, multi-layer foil having at least two adjacent metallic layers.

19. The method of claim 1, wherein the metallic substrate comprises a metal foil laminate comprising a metal barrier layer adhesively bonded to a polymer layer.

20. The method of claim 1, wherein the metallic substrate takes the form of a metal coating.

21. The method of claim 1, wherein the metallic substrate is constrained.

22. The method of claim 1, wherein the cover seal is essentially free of fusible metal alloy.

23. The method of claim 1, wherein the junction where the base and cover components meet is on a top surface of the enclosed housing.

24. The method of claim 1, wherein the steps of providing and adhering the cover seal are performed after the step of filling the enclosed housing with the desired gaseous medium.

* * * * *